United States Patent [19]

Ikezoe et al.

[11] Patent Number: 5,314,729
[45] Date of Patent: May 24, 1994

[54] ARTIFICIAL MARBLE

[75] Inventors: Mitsunori Ikezoe; Shigeru Motomiya, both of Osaka, Japan

[73] Assignee: Dainippon Ink and Chemicals, Inc., Tokyo, Japan

[21] Appl. No.: 736,444

[22] Filed: Jul. 29, 1991

[30] Foreign Application Priority Data

Jul. 30, 1990 [JP] Japan ................... 2-201705

[51] Int. Cl.5 .................... C08L 67/06; B32B 27/36
[52] U.S. Cl. .................... 428/15; 428/323; 428/327; 428/328; 428/480; 428/913.3; 523/521; 523/523; 524/401; 525/168; 528/272; 528/302; 528/303; 528/306; 528/308
[58] Field of Search ............ 428/15, 913.3, 480, 428/323, 327, 328; 156/61; 528/168, 272, 302, 303, 306, 308; 525/170, 171; 523/523, 521; 524/401

[56] References Cited

U.S. PATENT DOCUMENTS

| 4,149,920 | 4/1979 | Ealding | 428/910 |
| 4,233,413 | 11/1980 | Monma | 525/168 |
| 4,237,244 | 12/1980 | Von Harpe | 525/168 |

FOREIGN PATENT DOCUMENTS

| 84811 | 5/1983 | Japan | 525/168 |
| 58017 | 4/1984 | Japan . | |
| 66426 | 4/1984 | Japan . | |
| 59663 | 3/1987 | Japan | 525/168 |

Primary Examiner—Ellis P. Robinson
Assistant Examiner—Nasser Ahmad
Attorney, Agent, or Firm—Armstrong, Westerman, Hattori, McLeland & Naughton

[57] ABSTRACT

An artificial marble formed by molding a material, in which said material comprises an unsaturated polyester, an unsaturated polymerizable monomer, and a filler. The unsaturated polyester consists essentially of an acid component and an alcohol component, wherein said alcohol component contains at least a glycol selected from a group consisting of 2-methylpropane-1,3-diol, 3-methylpentane-1,5-diol, 3-methyl-2-pentene-1,5-diol, 2-isopropylidene-1,3-propanediol, 2-isopropyl-1,3-propanediol, and 2-methylene-1,3-propanediol.

4 Claims, No Drawings

ARTIFICIAL MARBLE

BACKGROUND OF THE INVENTION

1. Field of the present

The present invention relates to artificial marble which has superior impact resistance and thermal shock resistance, moreover is superior in formation cracking characteristics and heat resistance, and is formed by polymerization within a mold.

2. Related Art

In general, unsaturated polyester resins are produced by means of the production of an unsaturated polyester by means of the heat esterification of an unsaturated dibasic acid such as maleic acid anhydride, fumaric acid, itaconic acid or the like, or a mixture of such an unsaturated dibasic acid with a saturated dibasic acid such as phthalic acid anhydride, isophthalic acid, terephthalic acid, or the like, and by reaction with a glycol such as ethylene glycol, propylene glycol or the like, and the dissolving of the resulting unsaturated polyester with a polymerizable monomer such as styrene, vinyl toluene, diallyl phthalate, acrylic acid ester, methacrylic acid ester, and the like. Artificial marble is generally obtained by means of the polymerization curing in a mold of a compound consisting of this unsaturated polyester resin composition, a filler, and a curing catalyst. In order to improve the artificial marble by adding impact resistance and thermal shock resistance, saturated dibasic acids having a long straight main chain, such as adipic acid and sebacic acid, were conventionally used as the raw material for the unsaturated polyester, and glycols having a straight main chain, such as diethylene glycol, dipropylene glycol, polyethylene glycol, polypropylene glycol, 1,6-hexanediol, and the like, were used in an attempt to provide softness and flexibility characteristics.

However, when these raw materials were used, the water resistance of the cured resin was remarkably reduced, the artificial marble had inferior thermal shock resistance, and cracking occurred. Furthermore, artificial marble which did not possess gel coating on the surface layer thereof exhibited poor chemical resistance, and in addition the surface quality thereof was poor.

SUMMARY OF THE INVENTION

It is accordingly an object of the present invention to provide artificial marble which has superior impact resistance and thermal shock resistance, moreover has superior hot water resistance and chemical resistance, and can be formed by polymerization within a mold.

As a result of research concerning artificial marble, the present inventors have been able to discover a solution to the above problems by means of the use of a specified glycol component and have thus arrived at the present invention.

In other words, the present invention comprises: an unsaturated polyester which consists essentially of an acid component and an alcohol component, wherein the alcohol component has a structure containing an unsaturated polyester comprised using a glycol selected from a group containing 2-methylpropane-1,3-diol, 3-methylpentane-1,5-diol, 3-methyl-2-pentene-1,5-diol, 2-isopropylidene-1,3-propanediol, 2-isopropyl-1,3-propanediol, and 2-methylene-1,3-propanediol, an unsaturated polymerizable monomer, and a filler.

DETAILED DESCRIPTION OF THE PREFERRED EMBODIMENTS

The unsaturated polyester resin used in the present invention is produced by means of the polycondensation of an acid component comprising an $\alpha, \beta$-unsaturated dibasic acid or the acid anhydride thereof, or an aromatic saturated dibasic acid or the anhydride thereof, and an alcohol component containing a specified glycol, and in some cases, an aliphatic or cycloaliphatic saturated dibasic acid may be used concurrently as the acid component. The main components of the raw material of the artificial marble in accordance with the present invention comprise a composition in which 40 to 90 weight percent of an unsaturated polyester, and preferably 50 to 70 weight percent, are dissolved in 10 to 60 weight percent of an $\alpha, \beta$-unsaturated monomer, and preferably 30 to 50 weight percent thereof. In addition to the above-described example, the above-described unsaturated polyester resin also includes those in which the end group of the unsaturated polyester is vinyl-modified, and vinyl esters in which the end group of the epoxy group is vinyl-modified.

The following are used as the $\alpha, \beta$-unsaturated dibasic acid or the acid anhydride thereof: maleic acid, maleic acid anhydride, fumaric acid, itaconic acid, citraconic acid, chloromaleic acid, or the esters thereof, where maleic acid anhydride and fumaric acid are preferably used.

Examples of the aromatic saturated dibasic acid or the acid anhydride thereof are: phthalic acid, phthalic acid anhydride, isophthalic acid, terephthalic acid, nitrophthalic acid, tetrahydrophthalic acid anhydride, endomethylenetetrahydrophthalic acid anhydride, halogenated phthalic acid anhydride, or the esters thereof. Examples of the aliphatic or cycloaliphatic saturated dibasic acids include: oxalic acid, malonic acid, succinic acid, adipic acid, sebacic acid, azelaic acid, glutaric acid, hexahydrophthalic acid anhydride, and the esters thereof; these may be used singly or in combination. The following are preferably used as the saturated dibasic acid: phthalic acid anhydride, isophthalic acid, and terephthalic acid.

The glycols used in the present invention include one or a mixture of two or more of the following: 2-methylpropane-1,3-diol, 3-methylpentane-1,5-diol, 3-methyl-2-pentene-1,5 diol, 2-isopropylidene-1,3-propanediol, 2-isopropyl-1,3-propanediol, and 2-methylene-1,3-propanediol; these may also be used with normal glycol groups. The preferable amount of the entire glycol component used in the unsaturated polyester is 5 mole percent or more, and 30 mole percent or more is particularly preferable. In the case in which the amount used is less than 5 mole percent, the effects of the present invention are not realized.

The other glycols include, for example ethylene glycol, propylene glycol, diethylene glycol, dipropylene glycol, 1,3-butanediol, 1,4-butanediol, 2-methylpropylene-1,3-diol, neopentyl glycol, triethylene glycol, tetraethylene glycol, 1,5-pentanediol, 1,6 hexanediol, ethylene oxide/propylene oxide adducts of bisphenol A, hydrogenated bisphenol A, ethylene glycol carbonate, 2,2-di(4-hydroxypropoxydiphenyl) propane, and the like. These may be used independently or together; however, in addition to this, oxides such as ethylene oxide, propylene oxide and the like may be used in the same way.

Furthermore, it is possible to use condensation polymers of polyethylene terephthalate and the like as parts of the glycols and acid components.

Especially preferable are propylene glycol, ethylene glycol, neopenthyl glycol, and ethylene oxide/propylene oxide adducts of bisphenol A.

The acid value of the solid content of the unsaturated polyester is preferably below 58 and particularly preferably below 45.

Examples of the unsaturated polymerizable monomer (B) include: vinyl monomers or vinyl oligomers which are cross-linkable with unsaturated polyesters such as vinyl compounds of, for example, styrene, vinyl toluene, α-methylstyrene, chlorostyrene, dichlorostyrene, vinyl naphthalene, ethyl vinyl ether, methyl vinyl ketone, methyl acrylate, ethyl acrylate, methyl methacrylate, acrylonitrile, methacrylonitrile, and the like, or allyl compounds of, for example, diallyl phthalate, diallyl fumarate, diallyl succinate, triallyl cyanurate, and the like. These may be used independently or in combination; however, in general styrene is used. The amount of unsaturated polyester resin used is preferably from 30 to 90 weight percent, and particularly preferably from 50 to 70 weight percent.

Examples of the filler (C) include: calcium carbonate powder, clay, alumina, natural silica powder, talc, barium sulfate, pure silica powder, glass powder, glass beads, mica, magnesium silicate, cristobalite, magnesium hydroxide, quartz powder, colloidal silica, aluminum silicate, aluminum hydroxide, cellulose fibers, siliceous sand, river sand, kansuiseki (crystallized limestone), marble chips, and crushed stone and the like; among these, glass powder, aluminum hydroxide, calcium carbonate, and barium sulfate are preferable as they provide semitransparent qualities at the time of curing. The amount of filler added is preferably 30 to 80 weight percent with respect to the unsaturated polyester resin, and preferably more than 50 weight percent.

Examples of the curing catalyst include the following, which are used in the unsaturated polyester resin: azo compounds such as azoisobutyronitrile, and organic peroxides such as tertiary-butyl perbenzoate, tertiary-butyl peroctate, benzoyl peroxide, methylethyl ketone peroxide, dicumyl peroxide and the like; the amount used thereof is preferably within a range of from 0.3 to 3 parts per weight with respect to 100 parts per weight of unsaturated polyester resin.

As cure accelerators, metallic salts of organic acids are used, in particular cobalt salts, for example, metallic soaps such as cobalt naphthenate and cobalt octoate, and amines such as acetylacetone cobalt, p-diketones, quaternary ammonium salts such as dimethylbenzyl-ammoniachloride, dimethylaniline, N-ethyl-metatoluidine, triethanolamine, and the like.

As low-shrink agents, among thermoplastic resins, the following concrete examples can be given: lower alkyl esters of acrylic acid or methacrylic acids such as methyl methacrylate, ethyl methacrylate, butyl methacrylate, methyl acrylate, ethyl acrylate, and the like, independent polymers or copolymers of monomers such as styrene, vinyl chloride, vinyl acetate, and the like, copolymers consisting of at least one said vinyl monomer and at least one monomer selected from a group comprising lauryl methacrylate, isovinyl methacrylate, acrylamide, methacrylamide, hydroxylalkylacrylate or methacrylate, acrylonitrile, methacrylonitrile, acrylic acid, methacrylic acid, and cetylstearylmethacrylate, and in addition, cellulose acetate butylate, cellulose acetate propionate, polyethylene, polypropylene, saturated polyester and the like.

In the case in which the artificial marble is to be colored, it is possible to use organic or inorganic pigments or raw materials; however, it is necessary that the resistance to hot water and the curing of the unsaturated polyester resin not be hindered.

The artificial marble is formed by means of pouring the resin composition obtained in the above manner into a mold while deairing in a vibrator platform, or after vacuum degassing, subjecting the resin composition to polymerization reaction curing of a predetermined duration, and then forming the artificial marble into a desired shape and then post-curing. Furthermore, it is also possible to form and cure a gel coat resin layer in advance on the mold surface, which will be the surface of the finished product, and then to pour and cure the compound in the above manner. At this time, it is necessary that the gel coat resin possess resistance to hot water and chemical resistance, so that in general, isophthalic acids, terephthalic acids, bisphenols, unsaturated polyester resins, or vinyl ester resins are used. The artificial marble obtained by means of the production method of the present invention is applicable to the production of large-scale goods such as dressing tables with sinks, bathtubs, and counters.

Examples

Next, the invention will be further explained by means of the examples.

In the examples and comparative examples, "part" has the meaning of "parts per weight".

Example 1

3.2 moles of neopentyl glycol, 7.3 moles of 3-methylpentane-1,5-diol (3MP1, 5D; made by Kuraray), 6.7 moles of phthalic acid anhydride, and 3.3 moles of maleic acid anhydride were prepared in a four-mouthed flask equipped with a stirrer, a condensor, a temperature gauge and an entry port for inert gas, and in the presence of nitrogen gas and at 210 degrees Celsius, 66 parts of unsaturated polyester were obtained by the usual method To this 34 parts of styrene monomer, 30 ppm of hydroquinone, and 20 ppm of tertiary butylcatechol were added, and thereby a resin (1) was obtained. Next, 15 parts of 6 percent cobalt naphthenate, 100 parts of aluminum hydroxide (product name: HIGILITE H-100, Showa Denko Company), 100 parts of aluminum hydroxide (product name: HIGILITE H-310, Showa Denko Company), and 1.0 parts of methylethylketone peroxide 55% (curing catalyst product name: PERMEK, Nippon Yushi), were added to 100 parts of the resin, agitation was conducted by the stirrer, and a compound was thereby formed.

Polylite GC-253 (DaiNippon Ink & Chemicals, Inc.) was used as a gelcoat in advance by the normal method on a convex mold for an FRP-type dressing table with a sink, as a hot water-resistant isophthalic acid unsaturated polyester resin; after the curing of the gel coat, a concave mold was set, the compound was introduced into the mold, which was vibrated, this was sufficiently deaerated, and then the vibration was stopped and this was allowed to stand until the completion of gelation. After gelation, post-curing was conducted for 3 hours at 60 degrees Celsius, and an artificial marble molded article having a thickness of 10 mm, a length of 600 mm, and a width of 800 mm, and having in the center thereof a round sink, was formed. The molded article thus obtained has the moldability and special characteristics shown in Table 1.

Example 2

3.2 moles of propylene glycol, 7.1 moles of 3-methyl-pentane-1,5-diol (3MP1, 5D), 4.0 moles of phthalic acid anhydride and 6.0 moles of maleic acid anhydride were reacted in the same manner as in Example 1, and a resin (B) was obtained. A compound was formed under conditions identical to those of Example 1, pouring and post-curing were conducted, and an artificial marble molded article, which was identical to that of Example 1, was obtained. The moldability and characteristics of the molded article thus obtained are shown in Table 1.

Example 3

3.2 moles of propylene glycol, 7.1 moles of 2-methylpropane-1,3-diol (2MP1, 3D; Arco Chemicals), and 5 moles of isophthalic acid were prepared in a four-mouthed flask equipped with a stirrer, a condenser, a temperature gauge, and an entry port for inert gas, these were reacted at 215 degrees Celsius by a normal method in the presence of nitrogen gas, and when the acid number of the solid content reached a value of 5, 5 moles of maleic acid anhydride were added, and an unsaturated polyester was thus obtained; 45 parts of styrene monomer, 30 ppm of hydroquinone, and 20 ppm of tertiary butyl catechol were added to 55 parts of this unsaturated polyester, and a resin (C) was obtained.

A compound was formed under the same conditions as those of Example 1, pouring and post-curing were conducted, and an artificial marble molded article identical to that of Example 1 was obtained. The characteristics of the molded article thus obtained are shown in Table 1.

Example 4

15 parts of 6 percent cobalt naphthenate, 200 parts glass powder (product name M-10S, Nippon Ferro), and 1.0 parts of methylethyl ketone peroxide (55%) were added to 100 parts of the resin (C) obtained in Example 3, this was mixed and a compound thus formed Under conditions identical to those of Example 1, pouring and post-curing were conducted, and an artificial marble molded article was obtained. The characteristics of the molded article thus obtained are shown in Table 1.

Comparative Example 1

2.5 moles of neopentyl glycol, 8.2 moles of propylene glycol, 6.7 moles of phthalic acid anhydride, and 3.3 moles of maleic acid anhydride were reacted by a method identical to that of Example 1, and a resin (D) was obtained. A compound was formed from this under conditions identical to those of Example 1, pouring and post-curing were conducted, and an artificial marble molded article which was identical to that of Example 1 was obtained. The characteristics of the molded article thus obtained are shown in Table 1.

Comparative Example 2

8.2 moles of propylene glycol, 2.3 moles of neopentyl glycol, 5.7 moles of adipic acid, 1.0 moles of phthalic acid anhydride, and 3.3 moles of maleic acid anhydride were reacted in a manner identical to that of Example 1, and a resin (E) was obtained. A compound was formed from this resin under conditions which were identical to those of Example 1, pouring and post-curing were conducted, and an artificial marble molded article identical to that of Example 1 was obtained. The characteristics of the molded article thus obtained are shown in Table 1.

Comparative Example 3

8.2 moles of neopentyl glycol, 2.3 moles of diethylene glycol, and 5 moles of isophthalic acid were reacted in a manner identical to that of Example 3, and when the acid number of the solid content reached a value of 5, 5 moles of maleic acid anhydride were added and this was reacted, and a resin (F) was obtained. Under the same conditions as those of Example 1, a compound was formed, pouring and post-curing were conducted, and an artificial marble molded article was obtained. The characteristics of the molded article thus obtained are shown in Table 1.

Comparative Example 4

2.5 moles of propylene glycol, 8.2 moles of dipropylene glycol, 6.7 moles of phthalic acid anhydride, and 3.3 moles of maleic acid anhydride were reacted in a manner identical to that of Example 1, and a resin (G) was obtained. A compound was formed from this resin under conditions identical to those of Example 4, pouring and post-curing were conducted, and an artificial marble molded article was obtained. The characteristics of the molded article thus obtained are shown in Table 1.

In accordance with the present invention, by using specified glycols as the alcohol components of unsaturated polyester, it is possible to provide artificial marble which has superior formation cracking characteristics, heat resistance, and chemical resistance, while also being shock-resistant and thermal shock-resistant.

TABLE 1

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Resin Components | | | | | | | | |
| PG | | 3.2 | 3.2 | 3.2 | 8.2 | 8.2 | | 2.5 |
| NPG | 3.2 | | | | 2.5 | 2.3 | 8.2 | |
| DEG | | | | | | | 2.3 | |
| DPG | | | | | | | | 8.2 |
| 2MP1,3D | | | 7.1 | 7.1 | | | | |
| 3MP1,5D | 7.3 | 7.1 | | | | | | |
| PA | 6.7 | 4.0 | | | 6.7 | 1.0 | | 6.7 |
| IPA | | | 5.0 | 5.0 | | | 5.0 | |
| AA | | | | | | 5.7 | | |
| MA | 3.3 | 6.0 | 5.0 | 5.0 | 3.3 | 3.3 | 5.0 | 3.3 |
| Constants | | | | | | | | |
| NV (%) | 65 | 65 | 55 | 55 | 65 | 65 | 55 | 65 |
| Vis (ps) | 5 | 6 | 4.7 | 5 | 8 | 7 | 5 | 7 |
| Compound | | | | | | | | |

TABLE 1-continued

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Higilite H100 | 100 | 100 | 100 |  | 100 | 100 | 100 |  |
| Higilite H310 | 100 | 100 | 100 |  | 100 | 100 | 100 |  |
| Glassflit M10S |  |  |  | 200 |  |  |  | 200 |
| Thermal Shock Resistance*[1] | 1000 | 1800 | 1500 | 1600 | 300 | 500 | 500 | 800 |
| Formation Cracking | NO | NO | NO | NO | NO | NO | YES | NO |
| Heat Resistance at 200° C.*[2] (Pan Test) | ○ | ○ | ○ | ○ | Δ | Δ~X | ○ | Δ |

*[1] Based on CMI standards. Numbers represent cycles, where 1 minute 30 seconds at 5° C. and 1 minute 30 seconds at 80° C. represents 1 cycle.
*[2] Based on JIS-K-6902.
2MP1,3D: 2-methylpropane-1,3-diol
3MP1,5D: 3-methylpentane-1,5-diol
○ = no change, Δ = slightly discolored, X = turned yellow

What is claimed is:

1. An artificial marble formed by molding a material, in which said material comprises:
   an unsaturated polyester, which consists essentially of
      an acid component, wherein said acid component contains a first compound selected from the group consisting of α, β-unsaturated dibasic acids and anhydrides thereof and a second compound selected from the group consisting of aromatic saturated dibasic acids and anhydrides thereof, and
      an alcohol component, wherein said alcohol component contains 5 mole percent or mole of at least a glycol selected from the group consisting of 2-methylpropane-1,3-diol, 3-methylpentane-1,5-diol, 3-methyl-2-pentane-1,5-diol, 2-isopropylidene-1,3-propanediol, 2-isopropyl-1,3-propanediol, and 2-methylene-1,3-propanediol,
   an unsaturated polymerizable monomer, and
   a filler.

2. Artificial marble in accordance with claim 1, in which a selected glycol is 30 mole percent or more of a total glycol component of the unsaturated polyester.

3. Artificial marble in accordance with claim 1, in which an amount of filler added is greater than 100 parts by weight with respect to a total 100 parts by weight of unsaturated polyester (A) and unsaturated polymerizable monomer (B).

4. Artificial marble in accordance with claim 1, in which a weight ratio of unsaturated polyester (A) and unsaturated polymerizable monomer (B) is (A):(B)=40–90:10–60.

* * * * *